United States Patent
Baxter et al.

(10) Patent No.: US 7,908,305 B2
(45) Date of Patent: Mar. 15, 2011

(54) INTELLIGENT BUSINESS OBJECT DOCUMENT SYSTEM

(75) Inventors: Randy D. Baxter, Mesa, AZ (US); Vincent E. Price, Wake Forest, NC (US); Sterling R. Smith, Apex, NC (US); Christopher H. L. Wicher, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 12/103,260

(22) Filed: Apr. 15, 2008

(65) Prior Publication Data

US 2009/0259482 A1    Oct. 15, 2009

(51) Int. Cl.
*G06F 17/00* (2006.01)

(52) U.S. Cl. ... 707/999.101; 707/999.102; 707/999.103; 707/999.104

(58) Field of Classification Search ............... 707/999.101–999.104
See application file for complete search history.

(56) References Cited

U.S. PATENT DOCUMENTS

| | | | |
|---|---|---|---|
| 2003/0229529 A1* | 12/2003 | Mui et al. | 705/8 |
| 2008/0133303 A1* | 6/2008 | Singh et al. | 705/8 |
| 2008/0294449 A1* | 11/2008 | Knipp | 705/1 |

* cited by examiner

*Primary Examiner* — Sana Al-Hashemi
(74) *Attorney, Agent, or Firm* — Dillon & Yudell LLP (57) ABSTRACT

A method, system and computer program product for providing an integrated environment for processing business object documents (BODs). The integrated environment utilizes an IntelliBod system to employ standard business semantics while adapting modified business terms. Applications requesting integration, or mapping, map to common business semantics of the BODs, and the IntelliBOD system manages the business semantic (and technical) integration of the applications. IntelliBOD systems utilize JAVA environments to process requests, thereby reducing cost and space required to maintain general purpose middleware.

17 Claims, 8 Drawing Sheets

INTELLIGENT BUSINESS OBJECT DOCUMENT SYSTEM

BACKGROUND

1. Technical Field

The present invention generally relates to computer systems and in particular to the integration of communication applications in computer systems.

2. Description of the Related Art

Typically, middle market (mid-market) business organizations maintain between 50 and 1,000 computer systems. The mid-market organization is nominally larger than a small company, with no information technology (IT) department, but smaller than an enterprise with extensive on-site IT resources. Mid-market companies, similar to most companies, aim to be cost efficient, productive, and competitive.

Business object documents (BODs) are utilized to communicate business messages with inter and intra mid-market (as well as small and large) enterprises. Communication between similar and dissimilar software components and applications require specialized middleware to integrate the applications. Software architecture constructs utilized to integrate applications, such as Enterprise Service Bus (ESB) and process management systems, are robust and generalized, requiring extensive IT support and possibly large operating areas for additional computer systems.

Several problems exist with current processes utilized to integrate business applications, particularly applications associated with mid-market enterprise. Current technical integration and management terms such as Java message service (JMS), service data objects (SDO), Queue, and Java EE connector architecture (JCA) are known business semantics utilized in BODs; however, the terms are not shared among all applications. When business semantics are not shared among all applications, point-to-point application's program interface (API) mapping is required. Point-to-point API mapping comprises the steps of identifying the libraries required by the API by determining which program environment the API is operating in, scanning to detect and select libraries available to the determined program environment, dynamically loading the selected libraries, dynamically loading the selected libraries into the application, and binding the selected libraries to the associated API function call. The additional requirement of API mapping complicates the integration of applications for communication utilizing BODs.

SUMMARY OF ILLUSTRATIVE EMBODIMENTS

Disclosed are a method, system and a computer program product for providing an integrated environment for processing business object documents (BODs). The integrated environment utilizes an IntelliBod system to employ standard business semantics while adapting modified business terms. Applications requesting integration, or mapping, map to common business semantics of the BODs, and the IntelliBOD system manages the business semantic (and technical) integration of the applications. IntelliBOD systems utilize JAVA environments to process requests, thereby reducing cost and space required to maintain general purpose middleware. The above as well as additional features of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, system and computer program product for providing an integrated environment for processing business object documents (BODs). The integrated environment utilizes an IntelliBod system to employ standard business semantics while adapting modified business terms. Applications requesting integration, or mapping, map to common business semantics of the BODs, and the IntelliBOD system manages the business semantic (and technical) integration of the applications. IntelliBOD systems utilize JAVA environments to process requests, thereby reducing cost and space required to maintain general purpose middleware. The above as well as additional features of the present invention will become apparent in the following detailed written description.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIGS. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
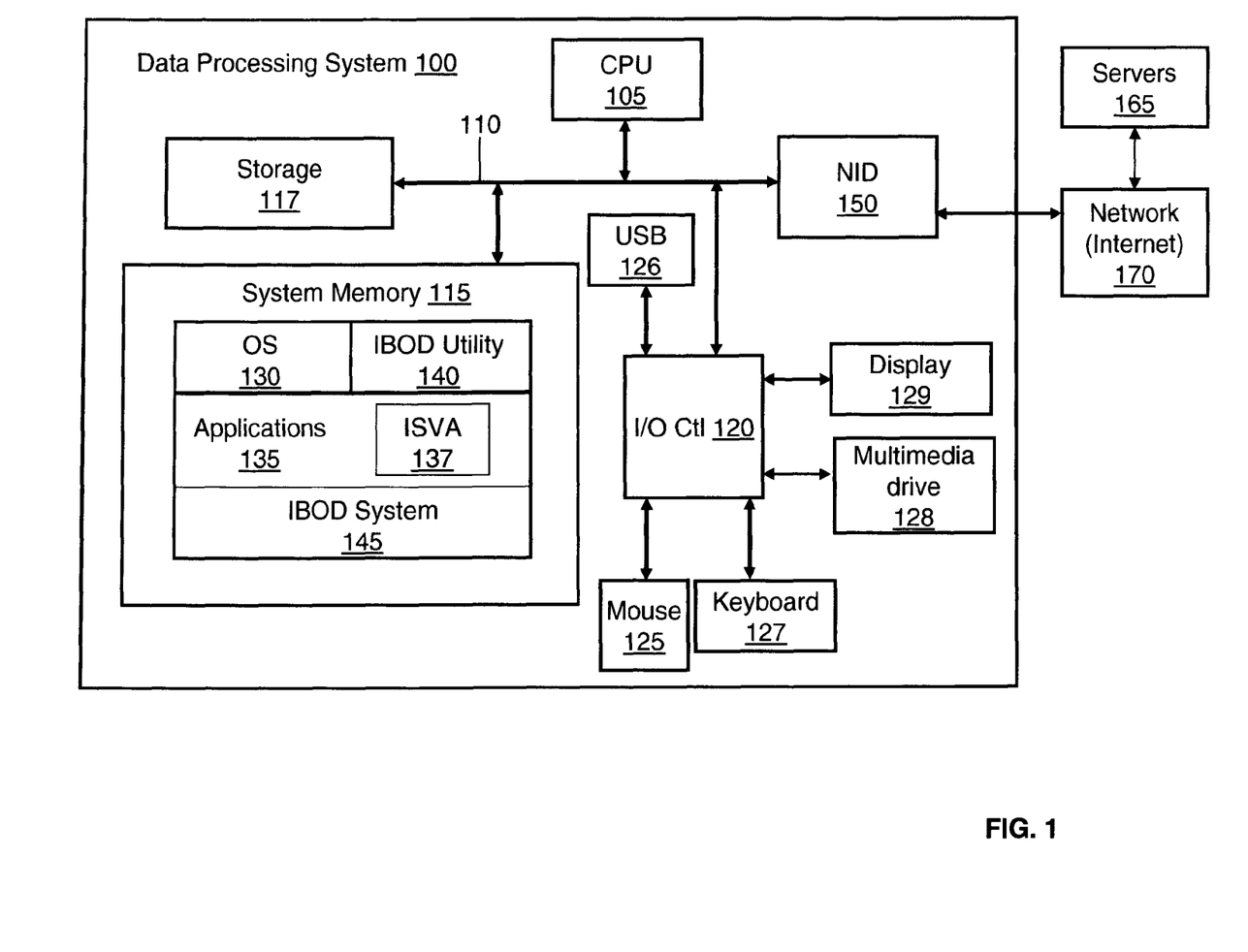
FIG. 1 is a diagram of an example data processing system and network according to one embodiment of the invention.

With reference now to the figures, FIG. 1 depicts a block diagram representation of a data processing system (and connected network). DPS 100 comprises at least one processor or central processing unit (CPU) 105 connected to system memory 115 via system interconnect/bus 110. Also connected to system bus 110 is I/O controller 120, which provides connectivity and control for input devices, of which pointing device (or mouse) 125 and keyboard 127 are illustrated, and output devices, of which display 129 is illustrated. Additionally, a multimedia drive 128 (e.g., CDRW or DVD drive) and USB (universal serial bus) port 126 are illustrated, coupled to I/O controller. Multimedia drive 128 and USB port 126 may operate as both input and output (storage) mechanisms. DPS 100 also comprises storage 117, within which data/instructions/code may be stored.

DPS 100 is also illustrated with a network interface device (NID) 150, with which DPS 100 connects to one or more servers 165 via an access network, such as the Internet 170. Notably, in addition to the above described hardware components of DPS 100, various features of the invention are completed via software (or firmware) code or logic stored within memory 115 or other storage (e.g., storage 117) and executed by CPU 105. Thus, illustrated within system memory 115 are a number of software/firmware components, including operating system (OS) 130 (e.g., Microsoft Windows®, a trademark of Microsoft Corp, GNU®/Linux®, registered trademarks of the Free Software Foundation and Linus Torvalds, or AIX®, a registered trademark of IBM), applications 135, Intelligent business object document (IBOD) utility 140, and IBOD system 145. Applications 135 may include independent software vendor application (ISVA) 137. In actual implementation IBOD utility 140, and IBOD system 145 may be combined as a single application collectively providing the various functions of each individual software component when the corresponding code is executed by the CPU 105. For simplicity, IBOD utility 140 and IBOD system 145 are illustrated and described as stand alone or separate software/firmware components, which provide specific functions, as described below.

CPU 105 executes IBOD utility 140 as well as OS 130, which supports the features of IBOD utility 140 and IBOD system 145. In the illustrative embodiment, IBOD utility 140 and IBOD system 145 provide several graphical user interfaces (GUI) to enable user interaction with, or manipulation of, the functional features of the utility (140). Among the software code provided by IBOD utility 140 and IBOD system 145, and which are specific to the invention, are: (a) code for enabling an integrated system of components, the IBOD system, to process a business object document; (b) code for receiving a destination to deliver the business object document when the destination is defined by one or more of: a noun and a verb within the business object document; and (c) code for delivering the business object documents to a target destination utilizing the IBOD system. For simplicity of the description, the collective body of code that enables these various features is referred to herein as IBOD utility 140.

According to the illustrative embodiment, when CPU 105 executes IBOD utility 140, DPS 100 initiates a series of functional processes that enable the above functional features as well as additional features/functionality, which are described below within the description of FIGS. 2-8.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
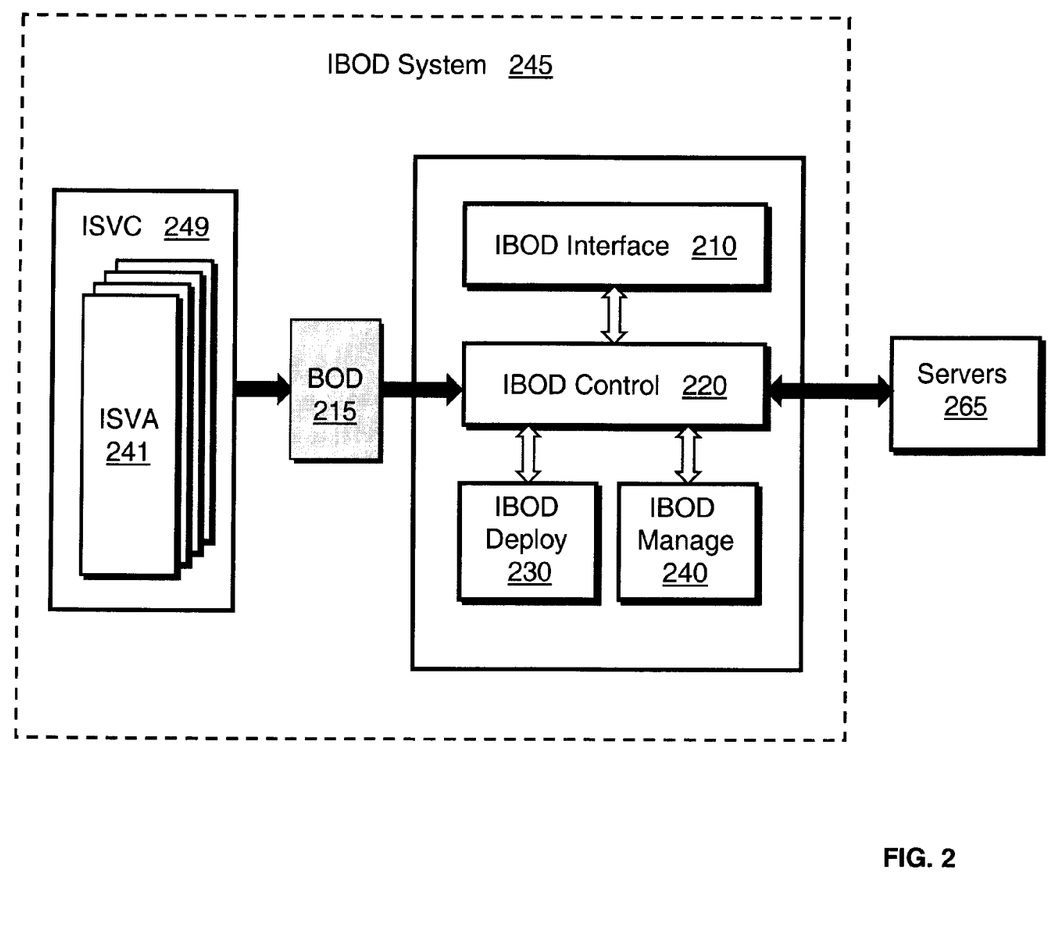
FIG. 2 is a diagram of a network of an IntelliBOD system and application server environment in accordance with one embodiment of the invention.

With reference now to FIG. 2, there is depicted a block diagram representation of an IBOD system. IBOD system 245 communicates with server 265. IBOD system 245 comprises the following software components: IBOD interface 210, IBOD control 220, IBOD deploy 230, and IBOD manage 240. IBOD control 220 receives BOD 215 from independent software vendor control (ISVC) 249. IBOD control 220 manages the operations of independent software vendor application (ISVA) 241.

In one embodiment, IBOD deploy 230 allows ISVC 249 (including ISVA 241) to be deployed within IBOD system 245. IBOD system 245 is delivered in a pre-configured deployment scheme. The deployment scheme installs the software components of IBOD system 245, configures middleware applications, and administers predefined rules for nouns and verbs, as well as routing BODs with assigned priority levels.

In one embodiment, BOD 215 comprises a business service request, wherein the business service request defines the purpose of BOD 215, utilizing verb and noun descriptions. BOD 215 also includes sender information, date and time of the BOD creation, as well as the business data area. BOD 215 contains one type of business request. Each time a different type of business request is required, a new BOD is constructed. The "verb" utilized in BOD 215 describes the actual service to be performed. The verb may be considered as the action of the business service request. The "noun" utilized in BOD 215 indicates the object the verb or action is to be performed on. The noun may be considered as the action item of the business service request. The business data area of BOD 215 includes codes, parameters, and values required to support the business service request, such as header and line information representing items to be purchased in a purchase order BOD. The sender information identifies the application and the server in which the BOD (215) originated.

In one embodiment, IBOD control 220 manages the operations of routing BOD 215 to one or more servers 265, registering applications such as ISVA 241 to communicate with IBOD system 245, and monitoring priorities and limitations of BOD 215. ISVC 249 retrieves BOD 215 from ISVA 241 and then delivers BOD 215 to IBOD control 220. When IBOD control 220 receives BOD 215, IBOD control 220 routes BOD 215 to a target server 265 as specified within BOD 215. IBOD control 220 provides routing based on the noun, verb, and assigned priority level of BOD 215. For example, if the verb for BOD 215 is "Process" (e.g. in the business service request title "ProcessPurchaseOrder"), then IBOD control 220 routes BOD 215 to the application that is registered to handle the processing of purchase orders. When the verb is "Sync" (e.g. in the business service request title "SyncPurchaseOrder"), IBOD control 220 routes BOD 215 to every application that is registered.

In one embodiment, a high, medium, or low priority level may be assigned to one or more of the noun and verb within BOD 215 and BOD 215. When the noun and verb within BOD 215 is assigned a high priority level, IBOD control 220 processes BOD 215 ahead of other messages. For example, a "ProcessPurchaseOrder" verb/noun combination with a high priority level may authorize the purchase order with the high priority level to be processed prior to preceding purchase orders. A high priority level may also be assigned to BOD 215. Assigning a high priority level to BOD 215 authorizes BOD 215 to be processed ahead of BODs submitted previously. A high priority level is superior to a medium priority level, and a medium priority level is superior to a low priority level. A low priority level is processed in the order received by IBOD control 220, unless a higher ranked priority BOD is submitted.

In one embodiment, IBOD interface 210 is utilized to link applications such as ISVA 241 to IBOD system 245. ISVA 241 utilizes simple objects, such as plain old Java objects (POJOs), to represent data elements within BODs. Simple objects form simple object trees which represent a full BOD. IBOD Interface 210 comprises "helper" components that convert POJOs to XML, as well as XML to POJOs. IBOD interface 210 performs validation and constraint checks on BOD 215 to verify BOD 215 is well formatted.

In one embodiment, IBOD manage 240 supervises IBOD system 245. IBOD manage 240 insures the software components within IBOD system 245 (i.e. IBOD interface 210, IBOD control 220, IBOD deploy 230, and ISVC 149) are operating appropriately. IBOD manage 240 provides an interface for registering new software applications and assures integration of new applications with IBOD system 245. Priority levels for BOD 215 may be set utilizing business semantics via the interface of IBOD manage 240.

Figure 3:
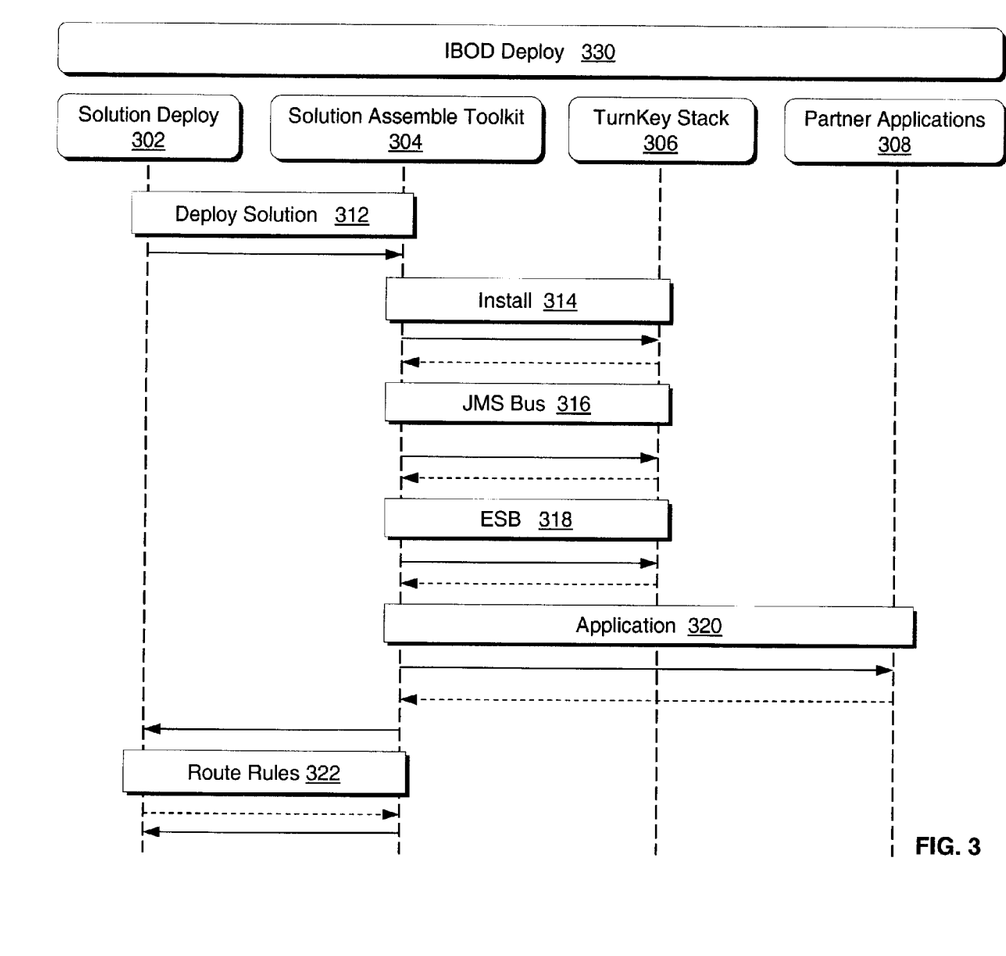
FIG. 3 is a diagram illustrating the main functions performed by the IntelliBOD deploy component according to one embodiment of the invention.

FIG. 3 illustrates the primary functions of IBOD deploy 330. Solution deploy 302, Solution Assemble Toolkit 304, turnkey stack 306, and partner applications 308 are a group of application programs utilized to complete the operations of IBOD deploy 330. Deploy solution 312, install 314, Java message service (JMS) bus 316, enterprise service bus (ESB) 318, application 320, and route rules 322 are functions initiated to support the operations of IBOD deploy 330.

In one embodiment, solution deploy 302 initiates deploy solution 312. Deploy solution 312 allows Solution Assemble Toolkit 304 and Turnkey Stack 306 to be installed via install 314. Solution Assemble Toolkit 304 and Turnkey Stack 306 configure JMS bus 316 and ESB 318 to operate within IBOD system 245 (FIG. 2). Solution Assemble Toolkit 304 may also be installed from a CD, DVD, or network location.

In one embodiment, the setup files of Solution Assemble Toolkit 304 and Turnkey Stack 306 support deployment of application 320 to partner applications 308. IBOD deploy 330 allows an ISV to deliver IBOD system 245 with application 320 to partner applications 308. Application 320 may be an ISV application delivered to partner applications 308 with the IBOD system via one or more servers 235 (FIG. 2).

Figure 4:
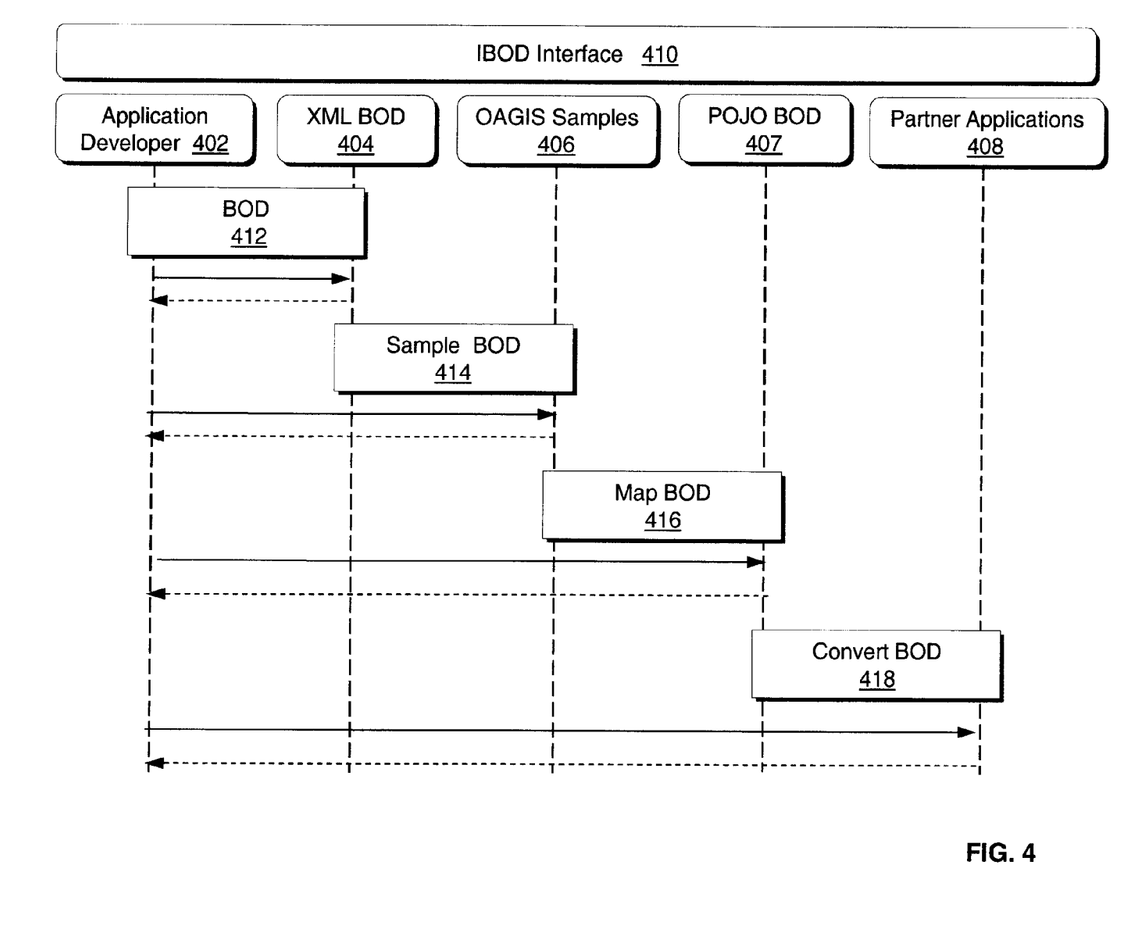
FIG. 4 is a diagram illustrating the approach an application utilizes to interface with IntelliBOD via the IntelliBOD interface component in accordance with one embodiment of the invention.

FIG. 4 illustrates functions an application provider may utilize to adopt IBOD system 245 to an existing system. Application developer 402, XML BOD 404, OAGIS samples 406, POJO BOD 407, and partner applications 408 are application elements presented to IBOD interface 410. BOD 412, sample BOD 414, map BOD 416, and convert BOD 418 are utilized by IBOD interface 410 to incorporate application elements.

IBOD interface 410 provides multiple methods of interfacing applications. In one embodiment, application developer 402 and XML BOD 404 provide BOD 412 to IBOD interface 410. BOD 412 is the BOD required for the current business request. To assists with selecting the correct BOD 412, OAGIS samples 406 provide sample BOD 414. Sample BODs 414 are example BODs which present the proper platform for completing BOD 412. When BOD 412 is completed, IBOD interface 410 determines the proper mapping for map BOD 416. IBOD interface 410 utilizes POJO BOD 407 to determine mapping for map BOD 416. IBOD interface 410 creates logical BOD mapping from the current internal format of BOD 412, which is XML BOD 404, to POJO BOD 407. Converting BOD 412 from POJO BOD 407 to XML BOD 404 is also available. Converting BOD 412 to convert BOD 418 is completed by automatically writing the mapping utility function to partner application 408.

Figure 5:
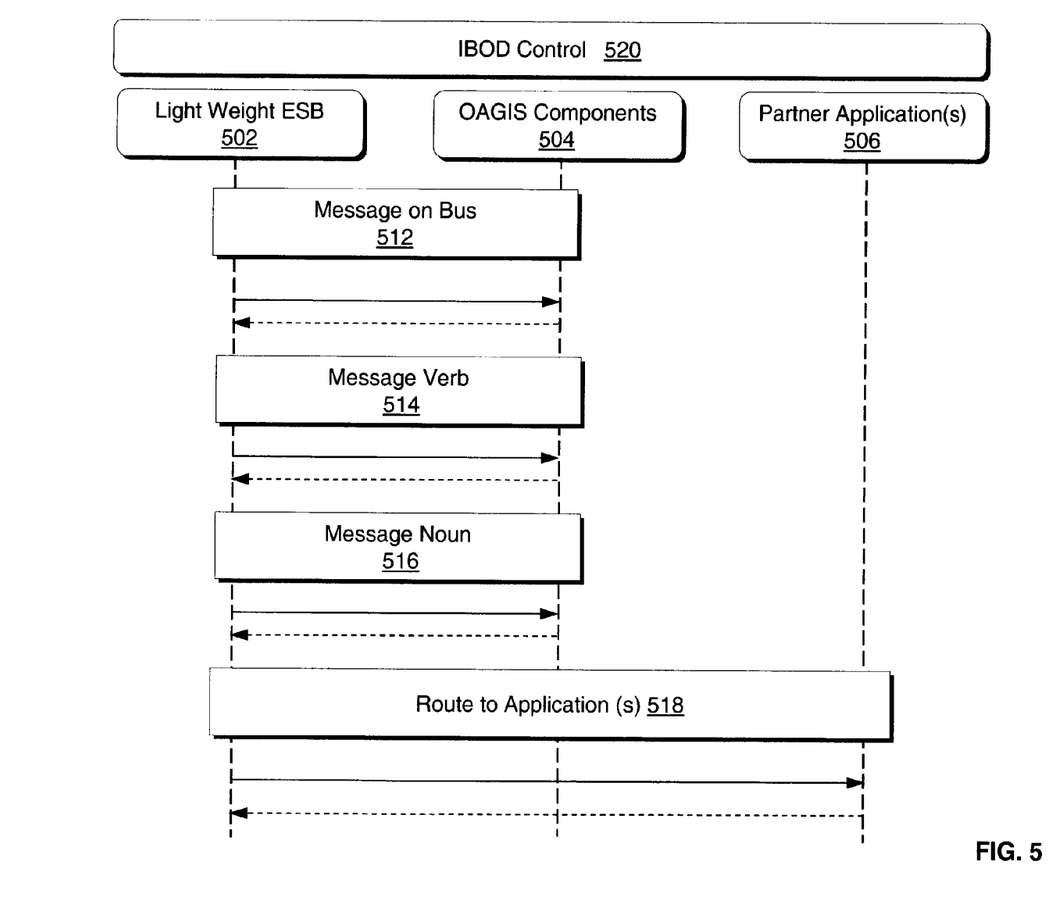
FIG. 5 is a diagram illustrating the routing performed by IntelliBOD control component according to one embodiment of the invention.

Routing performed by IBOD control 220 based on noun, verb, and priority level is illustrated in FIG. 5. Light Weight ESB 502, Open Applications Group Integration Specification (OAGIS) components 504, and partner application 506 are utilized by IBOD control 520 to assists with routing, according to the noun, verb, and priority level within the BOD. Message on bus 512, message verb 514, message noun 516, and route application 518 help determine the routing order and routing destination of the BOD.

In one embodiment, light weight ESB 502 detects message on bus 512. Message on bus 512 is a completed BOD message containing message verb 514 and message noun 516. OAGIS components 504 are utilized to identify message verb 514 and message noun 516. Message verb 514 and message noun 516 determine the location in which message on bus 512 is routed. Route to application(s) 518 then delivers message on bus 512 to the target destination.

In one embodiment, one or more of a high, medium, and low priority level may be assigned to message verb 514 and message noun 516. When a high, medium, or low priority level is associated with message verb 514, message on bus 512 is routed primarily according to message verb 514. When a high, medium, or low priority level is associated with message noun 516, message on bus 512 is routed primarily according to message noun 516. A high priority level associated with message verb 514 or message noun 516 lends primary precedence to message verb 514 or message noun 516. A high priority level takes precedence over a medium priority level, and a medium priority level takes precedence over a low priority level.

Figure 6:
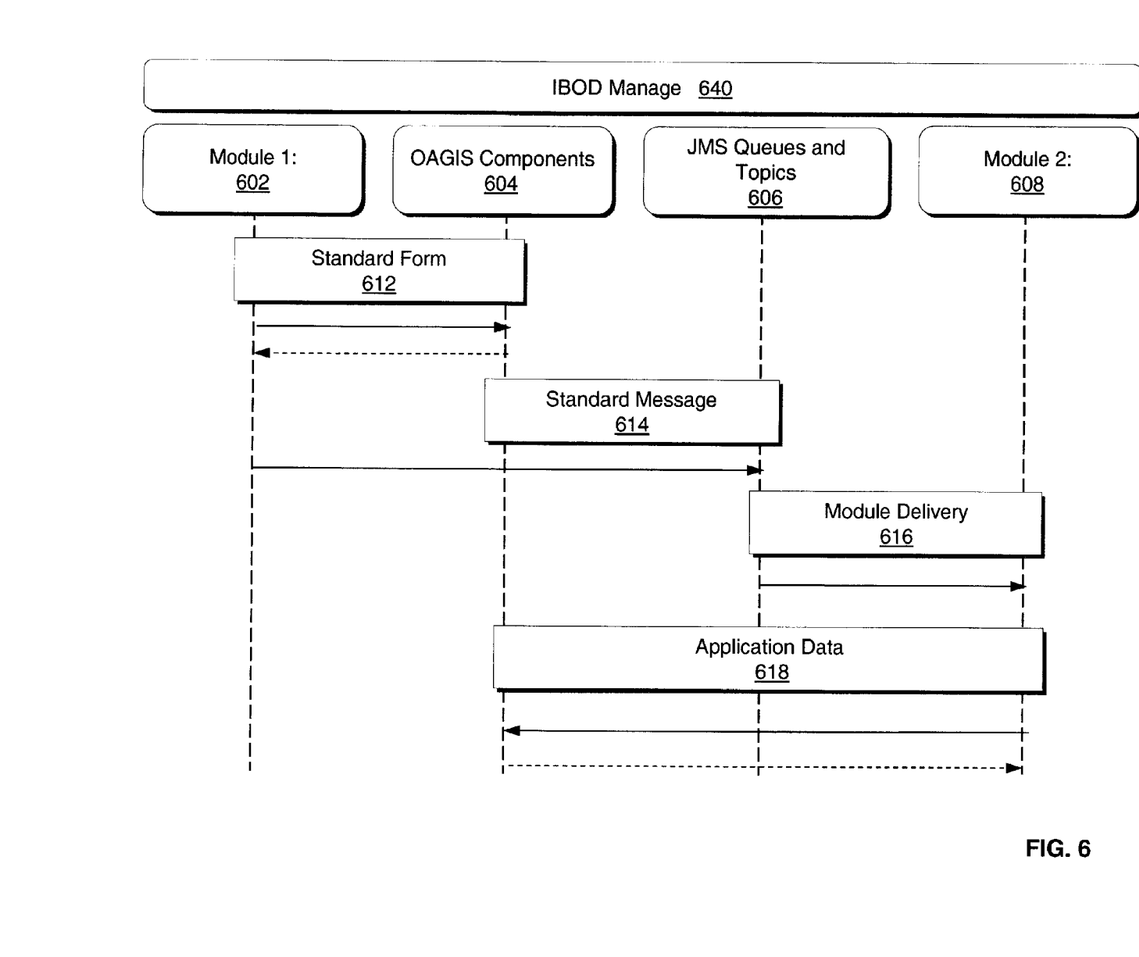
FIG. 6 is a diagram illustrating simplified integration of modules within a system of one or more types of modules according to one embodiment of the invention.

FIG. 6 illustrates simplified integration of modules within a system of one or more types of modules. IntelliBOD manage 640 comprises module 1 602, OAGIS components 604, JMS queues and topics 606, which along with module 2 608 are types of modules and/or applications from a number of sources. IntelliBOD system 145 utilizes standard form 612, standard message 614, module delivery 616, and application data 618 to operate between one or more modules and applications.

In one embodiment, an ISV application comprises one or more different modules and applications acquired from one or more different sources. Module 1 602 is an application module that allows standard form 612 to be created. Standard form 612 corresponds with OAGIS components utilizing IntelliBOD manage 640. Within standard form 612 is standard message 614. Standard message 614 is placed on a system bus to be transferred to OAGIS components 604. Module delivery 616 defines the type and location of the module in which standard message 614 is delivered. When standard message 614 is placed on the system bus, standard message 614 is delivered to module 2 608, as defined by module delivery 616. Standard message 614 (within standard form 612) is converted from standard form 612 to application data 618. Application data 618 allows IntelliBOD manage 640 to monitor business semantics of standard message 614 within standard form 612.

Figure 7:
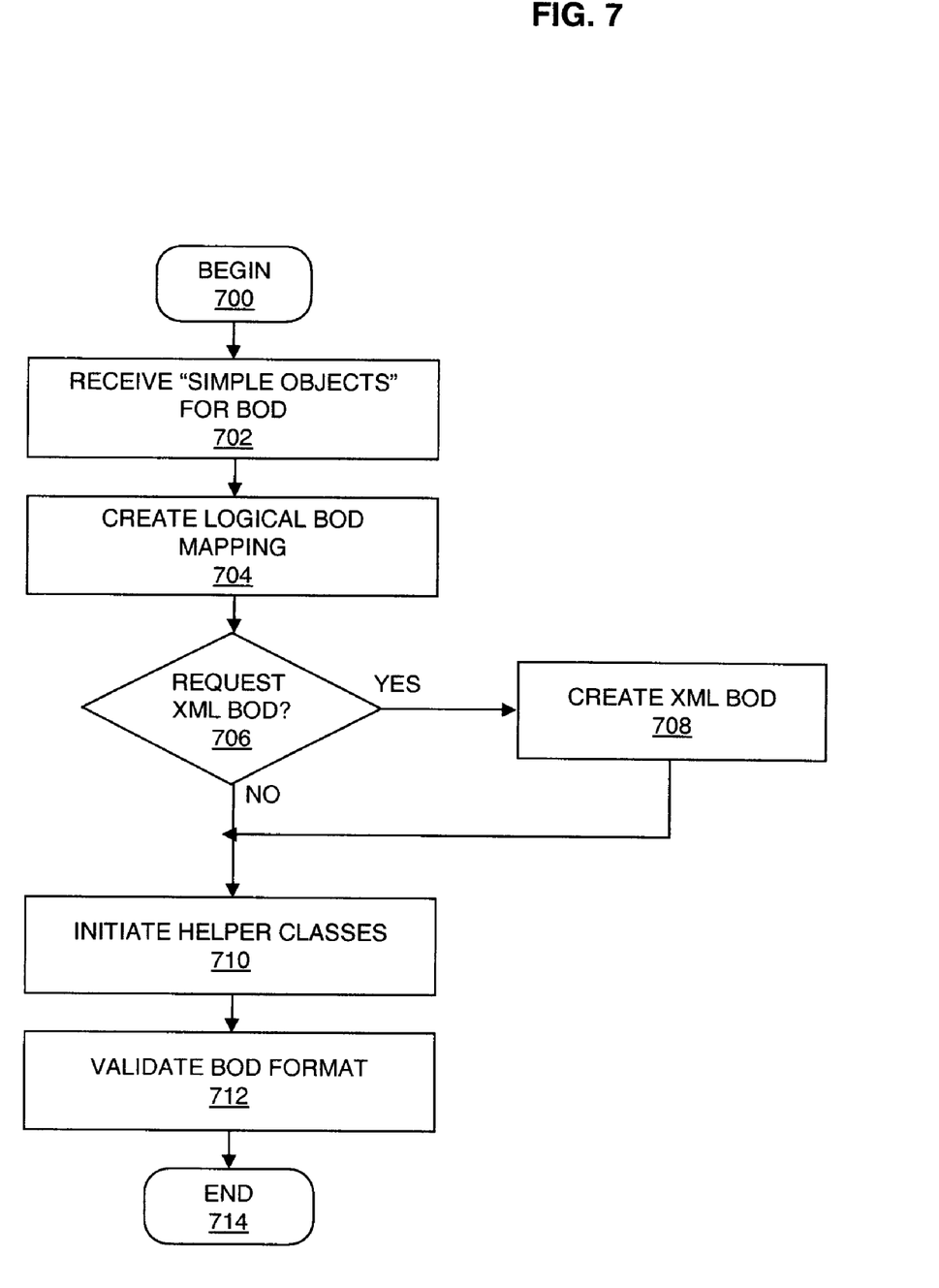
FIG. 7 is a logic flow chart illustrating the method for processing BODs via the IntelliBOD interface component according to one embodiment of the invention.
Figure 8:
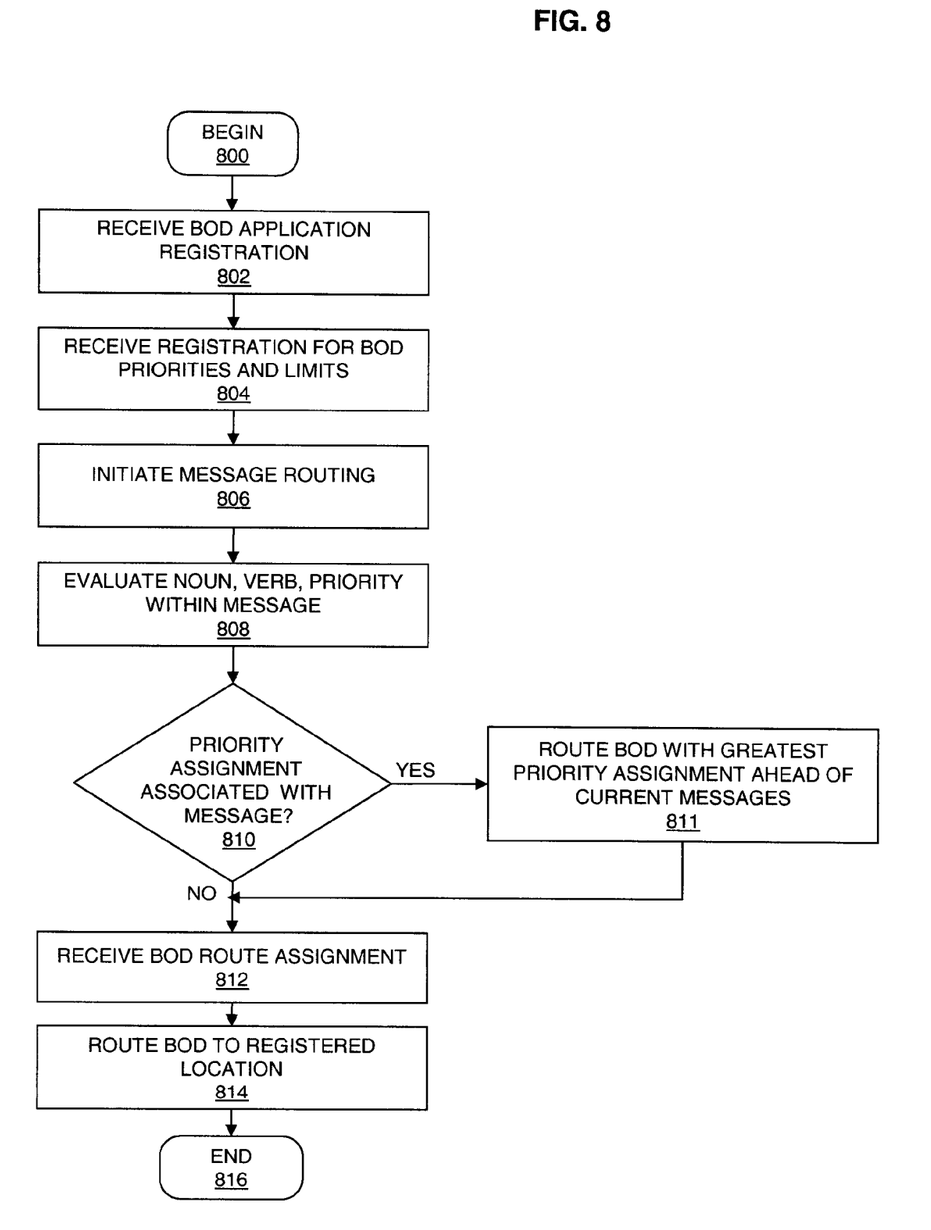
FIG. 8 is a logic flow chart illustrating the method for processing BODs utilizing the IntelliBOD control component according to one embodiment of the invention.

FIGS. 7-8 are flow charts illustrating various methods by which the above processes of the illustrative embodiments are completed. Although the methods illustrated in FIGS. 7-8 may be described with reference to components shown in FIGS. 1-6, it should be understood that this is merely for convenience and alternative components and/or configurations thereof can be employed when implementing the various methods. FIG. 7 illustrates the method for processing BODs via the IntelliBOD interface component, and FIG. 8 illustrates the method for processing BODs utilizing the IntelliBOD control component. Key portions of the methods may be completed by IBOD utility 140 and IBOD system 145 executing within DPS 100 (FIG. 1) and controlling specific operations on DPS 100, and the methods are thus described from the perspective of IBOD utility 140, IBOD system 145, and DPS 100.

The process of FIG. 7 begins at initiator block 700 and proceeds to block 702, at which simple objects for the BOD are received. Logical BOD mapping is created at block 704. A decision is made at block 706 whether a request to process a XML BOD is received. If the request to create a XML BOD is received, the process continues to block 708. If a request is not received to create a XML BOD, the process continues to block 710. At block 708, a XML BOD is created. Helper classes are initiated at block 710. Helper classes convert from (and to) XML to POJOs and from POJOs to XML. At block 712 the BOD is validated to insure the BOD is properly formatted. The process ends at block 714.

FIG. 8 describes the method for processing BODs utilizing the IntelliBOD control component. The process of FIG. 8 begins at initiator block 800 and proceeds to block 802, at which the BOD application registration is received. Registration for BOD priorities and limits are received at block 804. At block 806 message routing is initiated. The noun(s), verb(s), and priority settings within the BOD message are evaluated by IBOD utility 140, at block 808. At block 810 a decision is made whether there is a priority level associated with the BOD message. If a priority level is associated with the BOD message, the process continues to block 811. At block 811, the BOD with the greatest priority assignment is routed ahead of current messages, and the process continues to block 812. If there is no priority assignment associated with the BOD message, the process continues to block 812. At block 812 the route assignment for the BOD is received, and the BOD is routed to the registered location at block 814. The process ends at block 816.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:
1. A method comprising:
  enabling an integrated system of components for intelligently managing one or more business object documents (BODs), wherein said system is an IntelliBOD (IBOD) system;
  receiving at the IBOD system a BOD having one or more of a verb and a noun associated therewith, wherein the BOD is to be routed to a target destination device;
  intelligently routing/delivering the BOD to the target destination based on an analysis of the BOD, the verb and noun associated with the BOD and characteristics of the BOD, the verb and the noun;

activating an IBOD control component of the IBOD system;

receiving a BOD application registration;

receiving information about BOD priorities and limits as portions of the BOD characteristics;

performing one of: (a) retrieving a route assignment for the BOD or (b) assigning a route to the business object document, wherein the route is associated with the destination; and initiating message routing based on the received BOD characteristics to deliver the BOD to the destination.

2. A method comprising:

enabling an integrated system of components for intelligently managing one or more business object documents (BODs), wherein said system is an IntelliBOD (IBOD) system;

receiving at the IBOD system a BOD having one or more of a verb and a noun associated therewith, wherein the BOD is to be routed to a target destination device, wherein the target destination is a server;

intelligently routing/delivering the BOD to the target destination based on an analysis of the BOD, the verb and noun associated with the BOD and characteristics of the BOD, the verb and the noun;

registering applications, including independent software vendor applications (ISVAs) to communicate with IBOD system, wherein ISVA utilizes simple objects, such as plain old Java objects (POJOs), to represent data elements within BODs;

monitoring priorities and limitations of the BOD; and retrieving the BOD from an ISVA and delivering the BOD to an IBOD control, wherein in response to the BOD being received by the IBOD control, the IBOD control routes the BOD to a target server specified within BOD, wherein the IBOD control routes the BOD based on the noun, verb, and assigned priority level of BOD.

3. A computer program product comprising:

a computer readable medium; and program code on the computer readable medium that when executed within a processing device provides the functions of:

enabling an integrated system of components for intelligently managing one or more business object documents (BODs), wherein said system is an IntelliBOD (IBOD) system;

receiving at the IBOD system a BOD having one or more of a verb and a noun associated therewith, wherein the BOD is to be routed to a target destination device, wherein the target destination is a server; and intelligently routing/delivering the BOD to the target destination based on an analysis of the BOD, the verb and noun associated with the BOD and characteristics of the BOD, the verb and the noun;

registering applications, including independent software vendor applications (ISVAs) to communicate with IBOD system, wherein ISVA utilizes simple objects, such as plain old Java objects (POJOs), to represent data elements within BODs;

monitoring priorities and limitations of the BOD;

retrieving the BOD from an ISVA and delivering the BOD to an IBOD control, wherein when the BOD is received by the IBOD control, the IBOD control routes the BOD to a target server specified within BOD, wherein the IBOD control routes the BOD based on the noun, verb, and assigned priority level of BOD.

4. A computer program product comprising:

a computer readable medium; and program code on the computer readable medium that when executed within a processing device provides the functions of:

enabling an integrated system of components for intelligently managing one or more business object documents (BODs), wherein said system is an IntelliBOD (IBOD) system;

receiving at the IBOD system a BOD having one or more of a verb and a noun associated therewith, wherein the BOD is to be routed to a target destination device;

intelligently routing/delivering the BOD to the target destination based on an analysis of the BOD, the verb and noun associated with the BOD and characteristics of the BOD, the verb and the noun;

activating an IBOD control component of the IBOD system;

receiving a BOD application registration;

receiving information about BOD priorities and limits as portions of the BOD characteristics;

performing one of: (a) retrieving a route assignment for the BOD or (b) assigning a route to the business object document, wherein the route is associated with the destination; and initiating message routing based on the received BOD characteristics to deliver the BOD to the destination.

5. The method of claim 1, further comprising:

creating a logical BOD mapping in response to receiving simple objects which comprise the BOD;

detecting receipt of a request to process the BOD;

in response to receipt of a request to create an XML (eXtensible Markup Language) BOD, generating the XML BOD;

if the request is not received, initiating one or more helper classes to convert the BOD, wherein the BOD is converted from plain old Java objects (POJOs) to XML;

wherein when the BOD is in XML, the BOD is converted from XML to POJO.

6. The method of claim 1, further comprising:

evaluating a priority setting for one or more of the noun or the verb of the BOD and a priority setting of the BOD;

in response to a priority level of one of the noun or verb or the BOD being set to a high priority, performing the routing of the BOD ahead of other BODs and messages being handled by the IBOD system, wherein the BOD is routed to the target destination prior to other BODs being routed to their respective target destinations.

7. The method of claim 1, wherein said enabling comprises:

associating business semantics with technical terms;

assigning business concepts to technical deployment terms;

providing a management component to dynamically replace technical terms in the business object document with business semantics; and providing a JAVA environment to establish communication between the business object document and a software application.

8. A data processing device comprising:
a processor;
a routing mechanism for connecting to external components;
a memory coupled to the processor and having stored thereon programmable code that when executed by the processor provides the functions of claim 1.

9. The method of claim 2, wherein the registering comprises:
linking the ISVA to the IBOD system via an IBOD interface, wherein the IBOD Interface comprises helper components that convert POJOs to XML, and XML to POJOs, and wherein IBOD interface further performs validation and constraint checks on the BOD to verify that the BOD is well formatted.

10. The method of claim 2, further comprising:
registering new software applications and assuring integration of new applications with IBOD system via an interface provided by an IBOD manage component; and
enabling setting of the priority levels for the BOD utilizing business semantics via the interface of IBOD manage component.

11. The computer program product of claim 3, wherein said program code further comprises code for:
creating a logical BOD mapping in response to receiving simple objects which comprise the BOD;
detecting receipt of a request to process the BOD;
in response to receipt of a request to create an XML (eXtensible Markup Language) BOD, generating the XML BOD;
if the request is not received, initiating one or more helper classes to convert the BOD, wherein the BOD is converted from plain old Java objects (POJOs) to XML;
wherein when the BOD is in XML, the BOD is converted from XML to POJO.

12. The computer program product of claim 3, wherein the program code for performing the registering comprises code for:
linking the ISVA to the IBOD system via an IBOD interface, wherein the IBOD Interface comprises helper components that convert POJOs to XML, and XML to POJOs, and wherein IBOD interface further performs validation and constraint checks on the BOD to verify that the BOD is well formatted.

13. The computer program product of claim 3, wherein said program code further comprises program code for:
registering new software applications and assuring integration of new applications with IBOD system via an interface provided by an IBOD manage component; and
enabling setting of the priority levels for the BOD utilizing business semantics via the interface of IBOD manage component.

14. The computer program product of claim 3, wherein said program code for performing said enabling comprises code for:
associating business semantics with technical terms;
assigning business concepts to technical deployment terms;
providing a management component to dynamically replace technical terms in the business object document with business semantics; and
providing a JAVA environment to establish communication between the business object document and a software application.

15. The computer program product of claim 4, wherein said program code further comprises code for:
evaluating a priority setting for one or more of the noun or the verb of the BOD and a priority setting of the BOD;
in response to a priority level of one of the noun or verb or the BOD being set to a high priority, performing the routing of the BOD ahead of other BODs and messages being handled by the IBOD system, wherein the BOD is routed to the target destination prior to other BODs being routed to their respective target destinations.

16. The method of claim 6, wherein said routing comprises:
comparing a priority level of the BOD with the priority level of the other BODS and messages;
comparing a priority level of the verb of the BOD with the priority level of the verbs of the other BODS and messages;
comparing a priority level of the noun of the BOD with the priority level of the noun of the other BODS and messages; and
performing the routing of the BOD based on which one of BOD or the BOD characteristics has a higher priority level, wherein when the verb has a higher priority level than the verbs of other BODs, the BOD is routed according to the verb, when the noun has a higher priority level than then nouns of the other BODs, the BOD is routed according to the noun, and the BOD is routed according to general routing information of the BOD when neither the verb nor the noun has a high priority level.

17. The computer program product of claim 15, wherein said program code for performing said routing comprises code for:
comparing a priority level of the BOD with the priority level of the other BODS and messages;
comparing a priority level of the verb of the BOD with the priority level of the verbs of the other BODS and messages;
comparing a priority level of the noun of the BOD with the priority level of the noun of the other BODS and messages; and
performing the routing of the BOD based on which one of BOD or the BOD characteristics has a higher priority level, wherein when the verb has a higher priority level than the verbs of other BODs, the BOD is routed according to the verb, when the noun has a higher priority level than then nouns of the other BODs, the BOD is routed according to the noun, and the BOD is routed according to general routing information of the BOD when neither the verb nor the noun has a high priority level.

* * * * *